(12) United States Patent
Soga et al.

(10) Patent No.: US 7,015,258 B2
(45) Date of Patent: Mar. 21, 2006

(54) INK COMPOSITION FOR INK JET RECORDING, INK CARTRIDGE CONTAINING THE INK COMPOSITION, AND RECORDING APPARATUS USING THE INK COMPOSITION

(75) Inventors: Mamoru Soga, Osaka (JP); Hidekazu Arase, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 248 days.

(21) Appl. No.: 10/341,258

(22) Filed: Jan. 13, 2003

(65) Prior Publication Data

US 2003/0179267 A1 Sep. 25, 2003

(30) Foreign Application Priority Data

Jan. 15, 2002 (JP) ............................. 2002-005539

(51) Int. Cl.
*C09D 11/10* (2006.01)
*C08K 5/16* (2006.01)
*C08L 83/04* (2006.01)
*C08G 77/26* (2006.01)

(52) U.S. Cl. ................... 523/160; 524/262; 524/588; 528/38

(58) Field of Classification Search ............... 523/160, 523/161; 524/261, 262, 588; 528/38; 106/31.27
See application file for complete search history.

(56) References Cited

U.S. PATENT DOCUMENTS

| 5,030,746 A | * | 7/1991 | Schilling, Jr. ............... 556/410 |
| 6,264,730 B1 | * | 7/2001 | Matsumura et al. ..... 106/31.43 |
| 6,306,928 B1 | * | 10/2001 | Matsumura et al. ........ 523/160 |
| 6,585,362 B1 | * | 7/2003 | Blease et al. ................. 347/92 |

FOREIGN PATENT DOCUMENTS

| JP | 10-212439 A | 8/1998 |
| JP | 11-293167 A | 10/1999 |
| JP | 11-315231 A | 11/1999 |
| JP | 2000-178494 A | 6/2000 |

* cited by examiner

Primary Examiner—Callie Shosho
(74) Attorney, Agent, or Firm—Harness, Dickey & Pierce, P.L.C.

(57) ABSTRACT

The present invention provides an ink composition for ink jet recording, including an azo dye, a humectant, water, and an amino-group-containing water-soluble compound that undergoes condensation polymerization in the absence of the water (e.g., an aminosilane compound), wherein a straight-chain or branched alkyl group whose carbon number is two or more, an alkoxyl group, a phenyl group or a derivative group thereof, a phenoxyl group, or a six-membered or larger cycloalkyl group is introduced to a carbon atom at an α-position of the amino group in the amino-group-containing water-soluble compound that undergoes condensation polymerization in the absence of water.

10 Claims, 3 Drawing Sheets

INK COMPOSITION FOR INK JET RECORDING, INK CARTRIDGE CONTAINING THE INK COMPOSITION, AND RECORDING APPARATUS USING THE INK COMPOSITION

BACKGROUND OF THE INVENTION

1. Field of the Invention

The present invention relates to an ink composition suitable for ink jet recording, an ink cartridge containing the ink composition, and a recording apparatus using the ink composition.

2. Description of the Background Art

Ink containing a dye as a colorant, a humectant and water is well known in the art as ink for use in ink jet recording. However, an image that is formed on a recording medium such as recording paper by using ink containing a dye has poor water-resistivity. The water-resistivity will be very poor when the image is recorded on plain paper (a type of paper that is widely available on the market for with electrophotographic copiers, among others, but is not intended to have optimal structure, composition, properties, etc., for ink jet recording).

In view of this, it has been proposed in the art to improve the water-resistivity of an image on a recording medium by using ink containing a hydrolyzable aminosilane compound (an organic silicon compound), as shown in, for example, Japanese Laid-Open Patent Publication Nos. 10-212439, 11-293167, 11-315231 and 2000-178494. When the water of an ink droplet attached to the recording medium evaporates or permeates into the recording medium, the aminosilane compound undergoes condensation polymerization, and the condensation-polymerized aminosilane compound encloses the dye. Therefore, even if the image on the recording medium is wet with water, the dye does not bleed into the water. As a result, the water-resistivity of the image is improved.

As a dye for ink jet recording, an azo dye that includes an azo group having two nitrogen atoms double-bonded to each other is widely used for its desirable properties such as good color development.

Therefore, it may be possible to improve the water-resistivity of the image while maintaining good color development of ink by adding a hydrolyzable aminosilane compound, as proposed in the art, to ink that contains an azo dye.

However, when a hydrolyzable aminosilane compound, as it is, is added to ink that contains an azo dye, the good color development of the ink cannot be maintained, and it can rather result in discoloration or fading of ink. This is presumably due to the azo group of the azo dye being attacked by the amino group of the hydrolyzable aminosilane compound, whereby the double bond is turned into a single bond or is cleaved.

SUMMARY OF THE INVENTION

The present invention has been made in view of the above, and has an object to improve the water-resistivity of an image by adding an amino-group-containing water-soluble compound that undergoes condensation polymerization in the absence of water, such as a hydrolyzable aminosilane compound as described above, to ink containing an azo dye, wherein the amino-group-containing water-soluble compound is such that it can prevent discoloration or fading of the ink.

In order to achieve the object set forth above, a first ink composition for ink jet recording of the present invention includes an azo dye, a humectant, water, and an amino-group-containing water-soluble compound that undergoes condensation polymerization in the absence of the water, wherein a straight-chain or branched alkyl group whose carbon number is two or more, an alkoxyl group, a phenyl group or a derivative group thereof, a phenoxyl group, or a six-membered or larger cycloalkyl group is introduced to a carbon atom at an $\alpha$-position of the amino group in the amino-group-containing water-soluble compound that undergoes condensation polymerization in the absence of water.

Thus, the substituent such as an alkyl group or an alkoxyl group, which is introduced to the carbon atom at the $\alpha$-position of the amino group (the carbon atom bonded to the amino group) in the amino-group-containing water-soluble compound that undergoes condensation polymerization in the absence of water, serves as steric hindrance to the amino group attacking the azo group of the azo dye. Therefore, because of the substituent, it is substantially impossible for the amino group to approach within a certain distance of the azo group at which the amino group can attack the azo group, whereby it is possible to maintain the double bond between the two nitrogen atoms in the azo group. Even in the presence of such a substituent, the amino-group-containing water-soluble compound adequately undergoes condensation polymerization in the absence of water, whereby the azo dye is reliably enclosed by the condensation-polymerized water-soluble compound. Therefore, it is possible to improve the water-resistivity of the image by the use of the amino-group-containing water-soluble compound, while the attack on the azo group of the azo dye by the amino group of the amino-group-containing water-soluble compound is hindered by the substituent, thereby preventing discoloration or fading of the ink.

In the first ink composition for ink jet recording, it is preferred that the amino-group-containing water-soluble compound that undergoes condensation polymerization in the absence of water is a hydrolyzable aminosilane compound.

An aminosilane compound is very desirable as it improves the water-resistivity. However, if ink that contains an aminosilane compound and an azo dye is used, as it is, the amino group of the aminosilane compound attacks the azo group of the azo dye, thereby resulting in discoloration or fading of the ink. Nevertheless, according to the present invention, the attack on the azo group by the amino group is hindered by the substituent introduced to the carbon atom at the $\alpha$-position of the amino group, whereby discoloration or fading of the ink can be prevented while desirably improving the water-resistivity of the image.

It is preferred that the first ink composition for ink jet recording further includes a penetrant.

Thus, when an ink droplet is attached to a recording medium, water permeates into a recording medium more quickly as an ink droplet is attached to the recording medium, whereby the amino-group-containing water-soluble compound undergoes condensation polymerization more desirably, thus further improving the water-resistivity of the image.

Moreover, a second ink composition for ink jet recording of the present invention includes an azo dye, a humectant, water, and an amino-group-containing water-soluble compound that undergoes condensation polymerization in the absence of the water, wherein a substituent is introduced to a carbon atom at an $\alpha$-position of the amino group in the amino-group-containing water-soluble compound that undergoes condensation polymerization in the absence of water, the substituent serving as steric hindrance to the amino group attacking an azo group of the azo dye.

Thus, as with the first ink composition of the present invention, the attack on the azo group by the amino group is hindered by the substituent introduced to the carbon atom at the α-position of the amino group in the water-soluble compound, thereby preventing the double bond between the two nitrogen atoms in the azo group from being turned into a single bond or being cleaved. As a result, discoloration or fading of the ink can be prevented while improving the water-resistivity of the image. Note that the substituent is preferably a substituent that is capable of preventing the amino group from approaching within a distance of 2 Å of the azo group (specifically, those used in the first ink composition of the present invention, or the like). Then, it is substantially impossible for the amino group to attack the azo group.

In the second ink composition for ink jet recording, as in the first ink composition for ink jet recording, it is preferred that the amino-group-containing water-soluble compound that undergoes condensation polymerization in the absence of water is a hydrolyzable aminosilane compound, and it is preferred that the second ink composition for ink jet recording further includes a penetrant.

A first cartridge of the present invention includes an ink composition for ink jet recording, the ink composition including an azo dye, a humectant, water, and an amino-group-containing water-soluble compound that undergoes condensation polymerization in the absence of the water, wherein a straight-chain or branched alkyl group whose carbon number is two or more, an alkoxyl group, a phenyl group or a derivative group thereof, a phenoxyl group, or a six-membered or larger cycloalkyl group is introduced to a carbon atom at an α-position of the amino group in the amino-group-containing water-soluble compound that undergoes condensation polymerization in the absence of water.

Moreover, a second cartridge of the present invention includes an ink composition for ink jet recording, the ink composition including an azo dye, a humectant, water, and an amino-group-containing water-soluble compound that undergoes condensation polymerization in the absence of the water, wherein a substituent is introduced to a carbon atom at an α-position of the amino group in the amino-group-containing water-soluble compound that undergoes condensation polymerization in the absence of water, the substituent serving as steric hindrance to the amino group attacking an azo group of the azo dye.

A first recording apparatus of the present invention is a recording apparatus for performing a recording operation by discharging an ink composition for ink jet recording onto a recording medium, the ink composition including an azo dye, a humectant, water, and an amino-group-containing water-soluble compound that undergoes condensation polymerization in the absence of the water, wherein a straight-chain or branched alkyl group whose carbon number is two or more, an alkoxyl group, a phenyl group or a derivative group thereof, a phenoxyl group, or a six-membered or larger cycloalkyl group is introduced to a carbon atom at an α-position of the amino group in the amino-group-containing water-soluble compound that undergoes condensation polymerization in the absence of water.

Moreover, a second recording apparatus of the present invention is a recording apparatus for performing a recording operation by discharging an ink composition for ink jet recording onto a recording medium, the ink composition including an azo dye, a humectant, water, and an amino-group-containing water-soluble compound that undergoes condensation polymerization in the absence of the water, wherein a substituent is introduced to a carbon atom at an α-position of the amino group in the amino-group-containing water-soluble compound that undergoes condensation polymerization in the absence of water, the substituent serving as steric hindrance to the amino group attacking an azo group of the azo dye.

The first cartridge and the first recording apparatus include the first ink composition for ink jet recording, whereas the second cartridge and the second recording apparatus include the second ink composition for ink jet recording. Therefore, with these cartridges and recording apparatuses, discoloration or fading of the ink can be prevented while improving the water-resistivity of the image.

DESCRIPTION OF THE PREFERRED EMBODIMENTS

An embodiment of the present invention will now be described with reference to the drawings.

Figure 1:
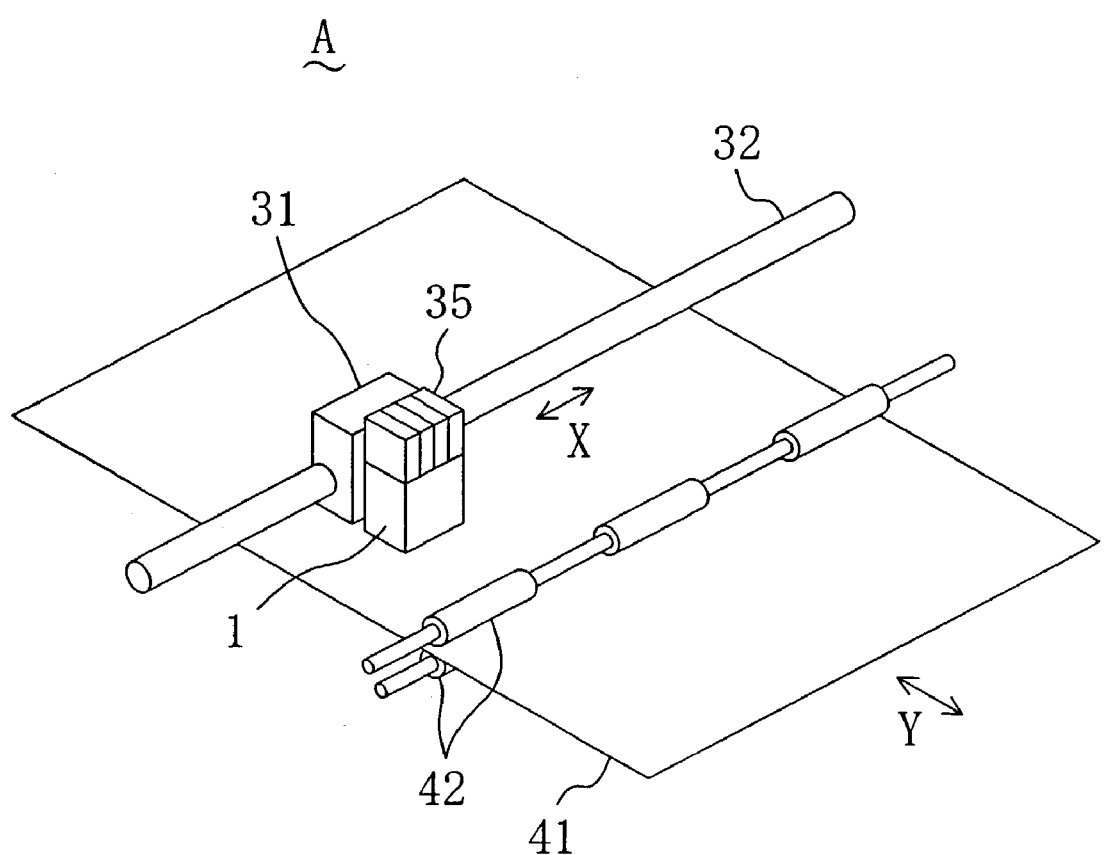
FIG. 1 is a schematic perspective view illustrating an ink jet recording apparatus that uses an ink composition for ink jet recording according to an embodiment of the present invention.
Figure 2:
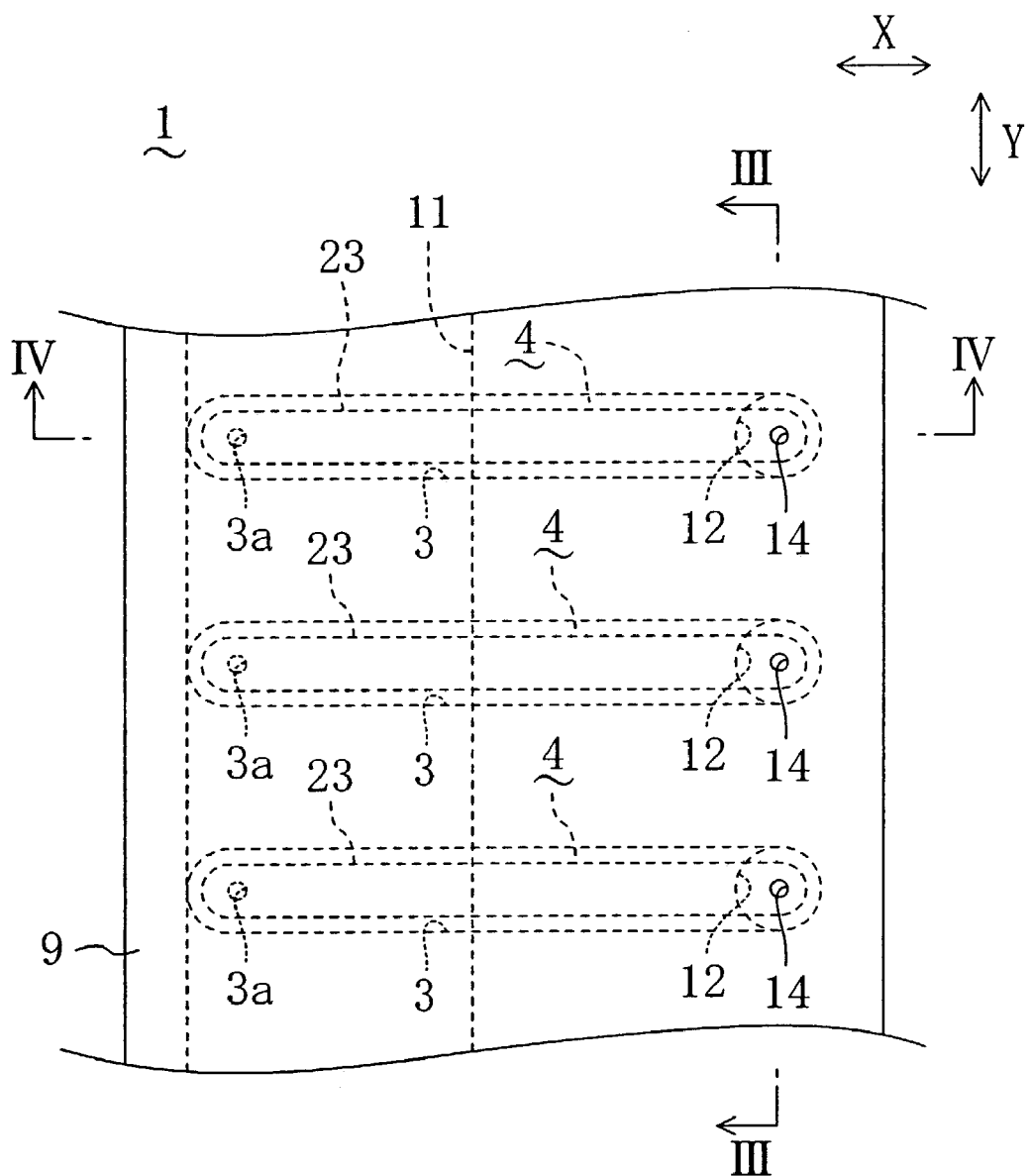
FIG. 2 is a diagram illustrating a part of the bottom surface of an ink jet head of the ink jet recording apparatus.

FIG. 1 schematically illustrates an ink jet recording apparatus A that uses an ink composition for ink jet recording according to an embodiment of the present invention. The recording apparatus A includes an ink jet head 1 for discharging ink to recording paper 41 as a recording medium. An ink cartridge 35 containing the ink is attached to the upper surface of the ink jet head 1. The ink jet head 1 is supported and fixed to a carriage 31. The carriage 31 is provided with a carriage motor (not shown). The ink jet head 1 and the carriage 31 are reciprocated by the carriage motor in the primary scanning direction (the X direction as shown in FIG. 1 and FIG. 2) while being guided by a carriage shaft 32 which extends in the primary scanning direction. The carriage 31, the carriage shaft 32 and the carriage motor together form relative movement means for relatively moving the ink jet head 1 and the recording paper 41 with respect to each other in the primary scanning direction.

The recording paper 41 is sandwiched between two carrier rollers 42 which are rotated by a carrier motor (not shown), and is carried by the carrier motor and the carrier rollers 42 under the ink jet head 1 in the secondary scanning direction (the Y direction as shown in FIG. 1 and FIG. 2) which is perpendicular to the primary scanning direction. The carrier motor and the carrier rollers 42 together form relative movement means for relatively moving the ink jet head 1 and the recording paper 41 with respect to each other in the secondary scanning direction.

Figure 3:
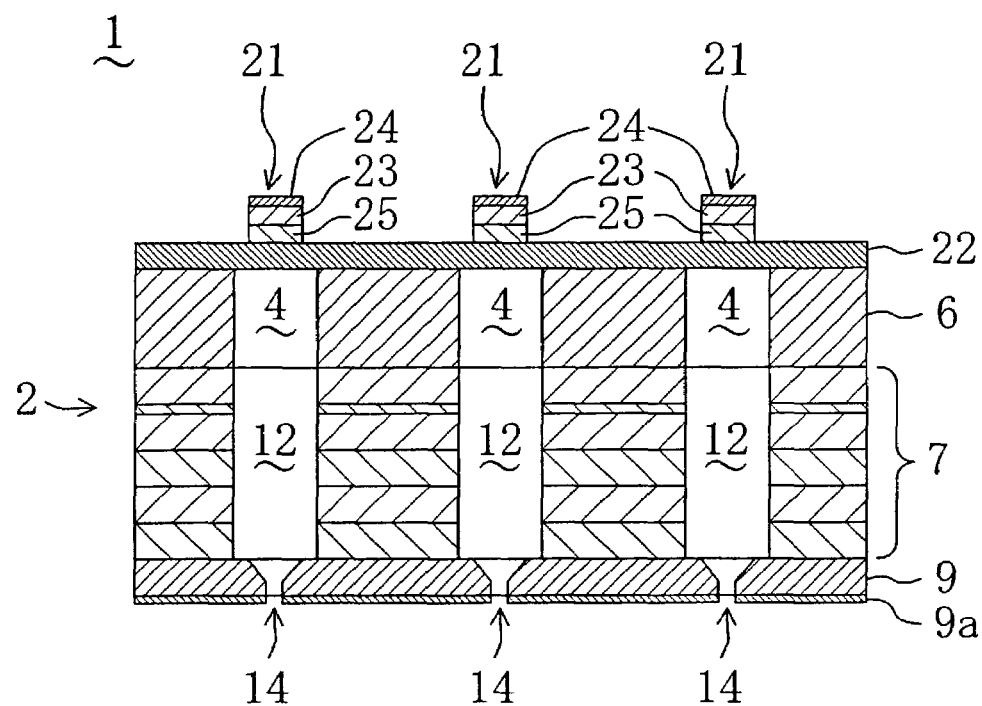
FIG. 3 is a cross-sectional view taken along line III—III of FIG. 2.
Figure 4:
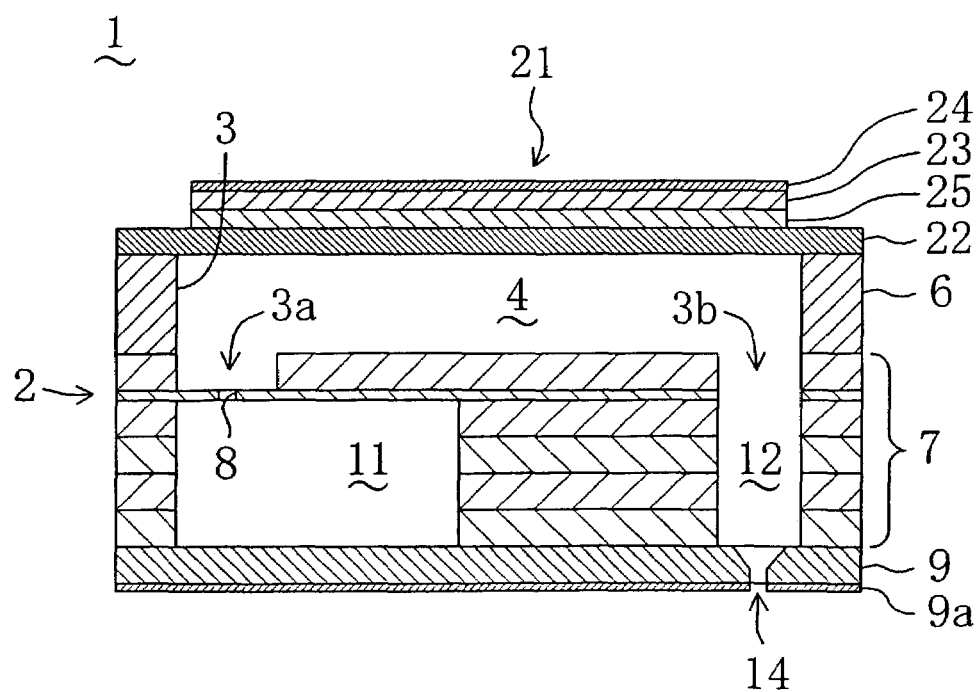
FIG. 4 is a cross-sectional view taken along line IV—IV of FIG. 2.

As illustrated in FIG. 2 to FIG. 4, the ink jet head 1 includes a head assembly 2 in which a plurality of pressure chamber depressions 3 are formed. Each pressure chamber depression 3 includes a supply port 3a through which ink is supplied, and a discharge port 3b through which ink is discharged. The depressions 3 of the head assembly 2 are opened so as to extend in the primary scanning direction on the upper surface of the head assembly 2, and are substantially equally spaced apart from one another in the secondary scanning direction. The total length of the opening of each depression 3 is set to be about 1250 μm and the width thereof is set to be about 130 μm. Note that the opposing end portions of the opening of each depression 3 are each in a generally semicircular shape.

A pressure chamber member 6 made of a photosensitive glass having a thickness of about 200 μm forms the side wall of each depression 3 of the head assembly 2. An ink channel member 7 forms the bottom wall of each depression 3. The ink channel member 7 is adhered and fixed to the lower surface of the pressure chamber member 6, and includes six thin stainless steel plates layered together. The ink channel member 7 includes therein a plurality of orifices 8 each connected to the supply port 3a of the depression 3, a ink supply channel 11 connected to the orifices 8 and extending in the secondary scanning direction, and a plurality of ink discharge channels 12 each connected to the discharge port 3b.

The orifices 8 are formed in the second one from the top of the six thin stainless steel plates of the ink channel member 7 that is thinner than the others. The diameter of each orifice 8 is set to be about 38 μm. Moreover, the ink supply channel 11 is connected to the ink cartridge 35 so that ink is supplied from the ink cartridge 35 into the ink supply channel 11.

The nozzle plate 9 made of a stainless steel is adhered and fixed to the lower surface of the ink channel member 7. In the nozzle plate 9, a plurality of nozzles 14 are formed so as to discharge ink droplets therethrough toward the recording paper 41. The lower surface of the nozzle plate 9 is covered with a water-repulsive film 9a. Each nozzle 14 is connected to the ink discharge channel 12, via which it is communicated to the discharge port 3b of the depression 3. The nozzles 14 are arranged in a row extending in the secondary scanning direction on the lower surface of the ink jet head 1. Note that each nozzle 14 includes a tapered portion where the nozzle diameter gradually decreases toward the nozzle exit, and a straight portion connected to the tip of the tapered portion. The nozzle diameter in the straight portion is set to be about 20 μm.

A piezoelectric actuator 21 is provided over each depression 3 of the head assembly 2. The piezoelectric actuators 21 have a vibration plate 22 made of Cr. The vibration plate 22, being adhered and fixed to the upper surface of the head assembly 2, covers each depression 3 of the head assembly 2 so as to form, together with the depression 3, a pressure chamber 4. The vibration plate 22 is a single member shared by all the piezoelectric actuators 21, and functions also as a common electrode shared by all piezoelectric elements 23 to be described later.

Moreover, each piezoelectric actuator 21 includes a piezoelectric element 23 made of lead zirconium titanate (PZT), and a separate electrode 24 made of Pt for applying, together with the vibration plate 22, a voltage (driving voltage) to the piezoelectric element 23. The piezoelectric element 23 is provided on one surface (upper surface) of the vibration plate 22 that is away from the pressure chamber 4 in an area corresponding to the pressure chamber 4 (an area opposing the opening of the depression 3), via an intermediate layer 25 made of Cu therebetween. The separate electrode 24 is provided on one surface (upper surface) of the piezoelectric element 23 that is away from the vibration plate 22.

Each of the vibration plate 22, the piezoelectric elements 23, the separate electrodes 24 and the intermediate layers 25 is a thin film. The thickness of the vibration plate 22 is set to be about 6 μm, the thickness of each piezoelectric element 23 is set to be 8 μm or less (e.g., about 3 μm), the thickness of each separate electrode 24 is set to be about 0.2 μm, and the thickness of the intermediate layer 25 is set to be about 3 μm.

The piezoelectric actuator 21 applies a driving voltage to the piezoelectric element 23 via the vibration plate 22, the intermediate layer 25 and the separate electrode 24 so as to deform a portion of the vibration plate 22 corresponding to the pressure chamber 4, thereby discharging ink from the pressure chamber 4 through the discharge port 3b and the nozzle 14. Specifically, when a pulse voltage is applied between the vibration plate 22 and the separate electrode 24, the piezoelectric element 23 contracts in the width direction, which is perpendicular to the thickness direction, through a piezoelectric effect at each rising edge of the pulse voltage. On the other hand, the vibration plate 22, the separate electrode 24 and the intermediate layer 25 do not contract. As a result, through a so-called "bimetal effect", a portion of the vibration plate 22 corresponding to the pressure chamber 4 bends toward the pressure chamber 4. The bending deformation increases the pressure in the pressure chamber 4, whereby ink in the pressure chamber 4 is discharged through the nozzle 14 via the discharge port 3b and the ink discharge channel 12 toward the recording paper 41 in the form of an ink droplet. The ink droplet is then attached to the surface of the recording paper 41 in the form of a dot. Then, at each falling edge of the pulse voltage, the piezoelectric element 23 expands, and a portion of the vibration plate 22 corresponding to the pressure chamber 4 returns to its original shape, whereby the pressure chamber 4 is refilled with ink supplied from the ink cartridge 35 via the ink supply channel 11 and the supply port 3a. Note that the pulse voltage to be applied to each piezoelectric element 23 may be a push-pull type pulse voltage as described above, or may alternatively be a pull-push type pulse voltage that first falls from a first voltage to a second voltage lower than the first voltage and then rises back to the first voltage.

The driving voltage is applied to the piezoelectric element 23 at a predetermined interval (e.g., about 50 μs: a driving frequency of 20 kHz) while the ink jet head 1 and the carriage 31 are moved across the recording paper 41 in the primary scanning direction at a substantially constant velocity. Note however that the voltage is not applied when the ink jet head 1 is at a position where the recording paper 41 is not supposed to receive an ink droplet. In this way, ink droplets land at predetermined positions on the recording paper 41. After scanning one line, the recording paper 41 is carried by a predetermined amount in the secondary scanning direction by the carrier motor and the carrier rollers 42, and then ink droplets are discharged while moving the ink jet head 1 and the carriage 31 in the primary scanning direction again so as to scan the next line. By repeating such an operation, an intended image is formed on the recording paper 41.

Ink used with the ink jet recording apparatus A includes an azo dye, a humectant for preventing the ink from being dried while the ink is in the nozzle 14, etc., of the ink jet head 1, water, and an amino-group-containing water-soluble compound that undergoes condensation polymerization in the absence of the water.

The azo dye is a dye that includes an azo group having two nitrogen atoms double-bonded to each other, and is preferably a water-soluble acidic dye or a direct dye.

When the water of an ink droplet, which has been discharged from the nozzle 14 of the ink jet head 1 and has been attached to the recording paper 41, evaporates or permeates into the recording paper 41, the amino-group-containing water-soluble compound undergoes condensation polymerization and encloses the azo dye. With the azo dye being enclosed by the amino-group-containing water-soluble compound, even if the image on the recording paper 41 is wet with water, the azo dye is prevented from bleeding into the water. Thus, the water-resistivity of the image is improved. The amino-group-containing water-soluble compound is preferably a hydrolyzed product obtained by hydrolyzing an alkoxysilane containing an amino-group-containing organic group and an alkoxysilane containing no amino group, or an organic silicon compound (a hydrolyzable aminosilane compound) obtained by hydrolyzing a hydrolyzable silane that is obtained by reacting an amino-group-containing hydrolyzable silane with an organic monoepoxy compound and a hydrolyzable silane containing no nitrogen atom.

A substituent that serves as steric hindrance to the amino group in the organic silicon compound attacking the azo group of the azo dye is introduced to the carbon atom at the α-position of the amino group (the carbon atom bonded to the amino group) in the organic silicon compound. Preferably, the substituent is capable of preventing the amino group from coming within a distance of 2 Å of the azo group, and is a straight-chain or branched alkyl group whose carbon number is two or more, an alkoxyl group, a phenyl group or a derivative group thereof, a phenoxyl group, or a six-membered or larger cycloalkyl group. An alkyl group, an alkoxy group, or the like, can be introduced to the carbon atom at the α-position of the amino group in the aminosilane compound as follows. Before an alkoxysilane containing an amino-group-containing organic group or an amino-group-containing hydrolyzable silane (these are termed herein as "aminosilanes") is reacted with an alkoxysilane containing no amino group or an organic monoepoxy compound, an alkyl group, an alkoxyl group, or the like, can be introduced, in advance, to the carbon atom at the α-position of the amino group in the aminosilane.

Examples of aminosilanes in which a straight-chain or branched alkyl group whose carbon number is two or more is introduced to the carbon atom at the α-position of the amino group include those of Formulae 1 to 10 below.

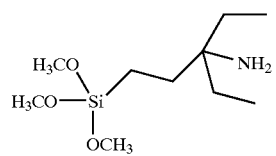

Formula 1

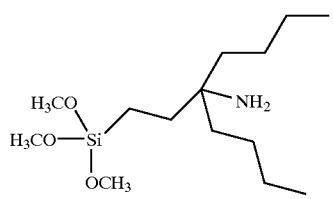

Formula 2

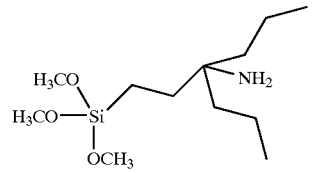

Formula 3

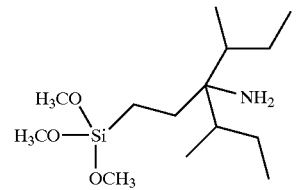

Formula 4

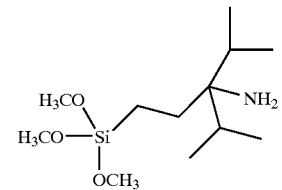

Formula 5

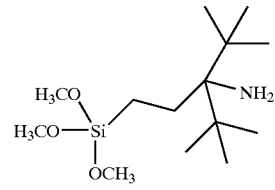

Formula 6

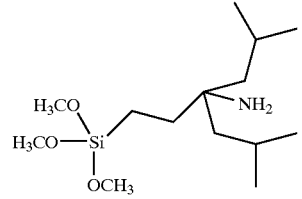

Formula 7

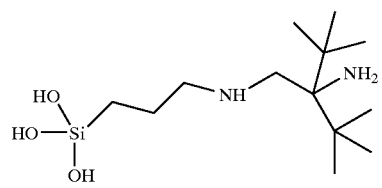

Formula 8

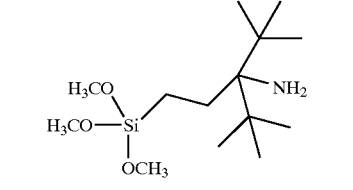

Formula 9

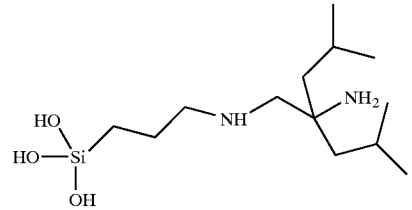

Formula 10

Moreover, examples of aminosilanes in which an alkoxyl group is introduced to the carbon atom at the α-position of the amino group include those of Formulae 11 and 12 below.

Formula 11

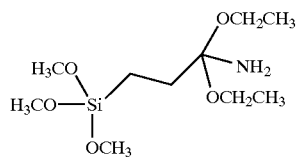

Formula 12

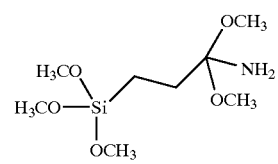

Furthermore, examples of aminosilanes in which a phenyl group or a derivative group thereof is introduced to the carbon atom at the α-position of the amino group include those of Formulae 13 to 22 below.

Formula 13

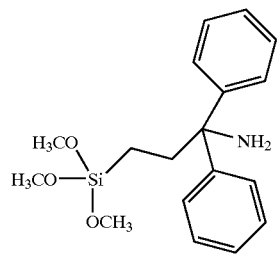

Formula 14

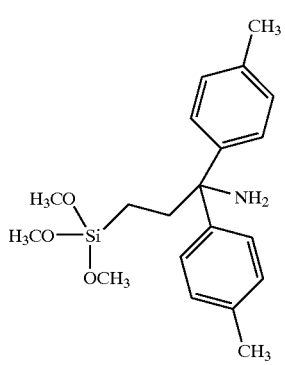

Formula 15

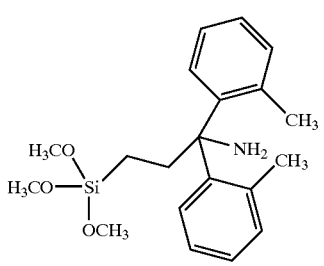

Formula 16

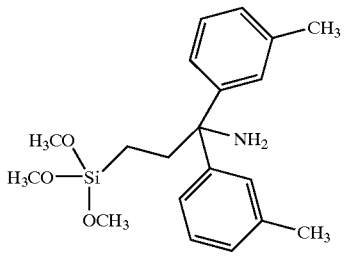

Formula 17

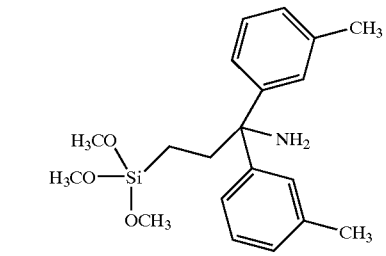

Formula 18

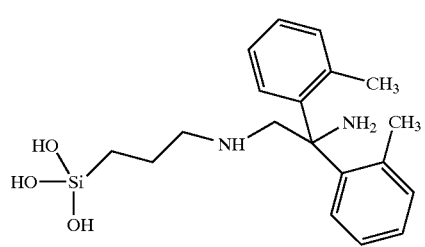

Formula 19

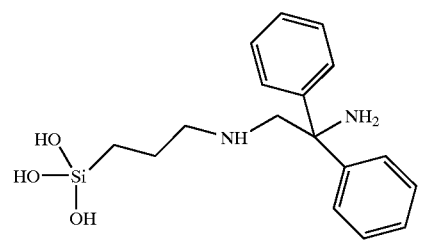

Formula 20

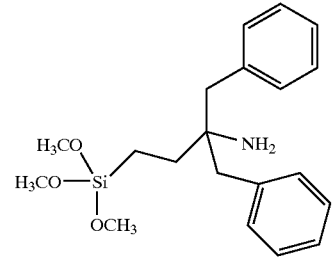

-continued

Formula 21

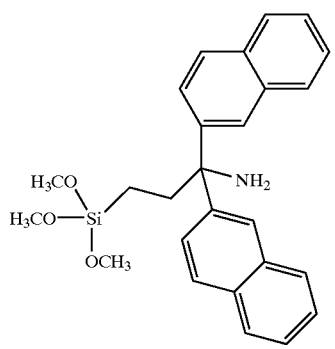

Formula 22

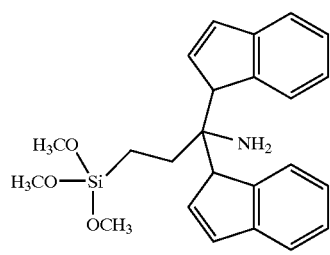

Moreover, examples of aminosilanes in which a phenoxyl group is introduced to the carbon atom at the α-position of the amino group include that of Formula 23 below.

Formula 23

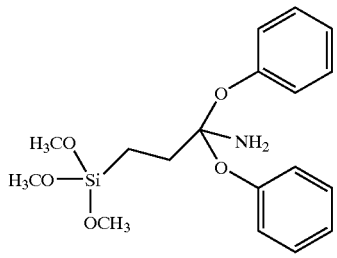

Furthermore, examples of aminosilanes in which a six-membered or larger cycloalkyl group is introduced to the carbon atom at the α-position of the amino group include those of Formulae 24 and 25 below.

Formula 24

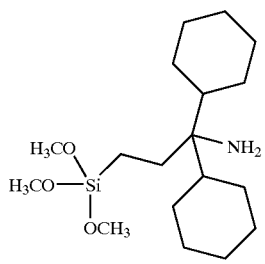

-continued

Formula 25

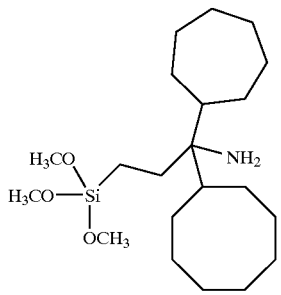

Each of the aminosilanes of Formulae 1 to 25 above can be synthesized easily by reacting an appropriate aminoalkene and an appropriate trialkoxysilane with each other using a conventional method. The catalyst for the reaction may be a transition metal catalyst such as hexachloroplatinic(IV) acid [$H_2PtCl_6$], dichlorobis(triphenylphosphine)platinum (II) [$PtCl_2(PPh_3)_2$], or dichlorobis(triphenylphosphine) rhodium(I) [$RhCl_2(PPh_3)_3$].

For example, the aminosilane of Formula 1 can be obtained by reacting 3-amino-3-ethyl-1-pentene with trimethoxy silane. Specifically, 14 g (0.125 mol) of 3-amino-3-ethyl-1-pentene, 0.35 g of an isopropyl alcohol solution containing 4% by volume of $H_2PtCl_6$ and 500 ml of toluene are charged in a 1000-ml glass flask reactor having a stirrer, a reflux condenser, a thermometer and a dropping funnel. Then, 15.5 g (0.15 mol) of trimethoxy silane is added drop by drop into the mixture through the dropping funnel at 60° C. to 70° C. over a one-hour period, and the mixture is aged at 70° C. for two hours. Then, the obtained solution is treated with active carbon, and the low-boiling fraction is distilled under reduced pressure, thereby obtaining 13.5 g of the aminosilane of Formula 1.

The aminosilanes of Formulae 2 to 25 can easily be obtained through a procedure as described above except that other amino alkenes are used instead of 3-amino-3-ethyl-1-pentene.

The humectant is preferably a polyhydric alcohol such as glycerol or a water-soluble nitrogen heterocyclic compound such as 2-pyrrolidone or N-methyl-2-pyrrolidone.

Preferably, the ink composition further includes a penetrant for increasing the permeability thereof into the recording paper 41. The penetrant is preferably a monoalkyl ether of a polyhydric alcohol such as diethylene glycol monobutyl ether, and is preferably contained in the ink in an amount of 1 to 50% by mass with respect to the whole ink. If it is less than 1%, the surface tension of the ink at 25° C. will not be 50 mN/m or less, as will be described later, whereby it is not possible to obtain a sufficient effect of allowing the ink to permeate into the recording paper 41. On the other hand, if it is greater than 50%, the water solubility of the dye and that of the silane compound deteriorate.

When a penetrant is used, it is preferred that the surface tension of the ink at 25° C. is set to be 20 to 50 mN/m by adjusting the amount of the penetrant to be contained in the ink. If the surface tension is less than 20 mN/m, the ink being discharged from the nozzle 14 will not easily be formed into droplets. On the other hand, if it is greater than 50 mN/m, the ink will not easily permeate into the recording paper 41. Note that it may not be possible, only by the inclusion of a penetrant, to adjust the surface tension to about 20 mN/m. In such a case, a fluoroalkyl active agent may be added as an adjuvant to the penetrant. The fluoroalkyl active agent is preferably ammonium perfluoroalkyl sulfonate, potassium perfluoroalkyl sulfonate, or potassium perfluoroalkyl carboxylate, for example.

Thus, in the embodiment described above, the ink composition for ink jet recording includes an azo dye, a humectant, water, and an amino-group-containing water-soluble compound that undergoes condensation polymerization in the absence of the water, whereby when the water of an ink droplet, which has been attached to the recording paper 41, evaporates or permeates into the recording paper 41, the amino-group-containing water-soluble compound undergoes condensation polymerization and encloses the dye. Thus, the water-resistivity of the image on the recording paper 41 is improved. Although the inclusion of the amino-group-containing water-soluble compound as described above improves the water-resistivity of the image, if the amino-group-containing water-soluble compound is used as it is, the azo group of the azo dye is attacked by the amino group of the amino-group-containing water-soluble compound, and the double bond between two nitrogen atoms in the azo group is turned into a single bond or is cleaved, thereby resulting in discoloration or fading of the ink.

However, in the present embodiment, a substituent that serves as steric hindrance to the amino group in the amino-group-containing water-soluble compound attacking the azo group of the azo dye is introduced to the carbon atom at the α-position of the amino group in the amino-group-containing water-soluble compound, whereby it is possible to prevent such discoloration or fading of the ink. Specifically, the substituent introduced to the carbon atom bonded to the amino group serves as steric hindrance to the amino group attacking the azo group of the azo dye, whereby the attack on the azo group by the amino group is depressed by the substituent. Particularly, if the substituent is capable of preventing the amino group from coming within a distance of 2 Å of the azo group (specifically, a straight-chain or branched alkyl group whose carbon number is two or more, an alkoxyl group, a phenyl group or a derivative group thereof, a phenoxyl group, or a six-membered or larger cycloalkyl group), it is substantially impossible for the amino group to attack the azo group, whereby it is possible to maintain the double bond between the two nitrogen atoms in the azo group. Even in the presence of such a substituent, the amino-group-containing water-soluble compound adequately undergoes condensation polymerization in the absence of water, whereby the azo dye is reliably enclosed by the condensation-polymerized water-soluble compound. Therefore, it is possible to improve the water-resistivity of the image by the use of the amino-group-containing water-soluble compound, while depressing the attack on the azo group of the azo dye by the amino group of the amino-group-containing water-soluble compound, thereby preventing discoloration or fading of the ink.

Moreover, if a penetrant is contained in the ink, water permeates into the recording paper 41 more quickly as an ink droplet is attached to the recording paper 41, whereby the amino-group-containing water-soluble compound undergoes condensation polymerization more desirably, thus further improving the water-resistivity of the image.

Now, examples of the present invention will be described.

In Examples 1 to 33, 33 ink compositions for ink jet recording were produced. Note that in the ink composition shown in each example below, the amount of each component is given in % by mass. Specifically, a hydrolyzable aminosilane compound (an organic silicon compound) was used as the amino-group-containing water-soluble compound, and a straight-chain or branched alkyl group whose carbon number is two or more, an alkoxyl group, a phenyl group or a derivative group thereof, a phenoxyl group, or a six-membered or larger cycloalkyl group was introduced to the carbon atom at the α-position of the amino group in the hydrolyzable aminosilane compound.

Note that while no penetrant was used in Examples 1 to 5, diethylene glycol monobutyl ether was used as a penetrant in Examples 6 to 33.

Moreover, in all of Examples 1 to 33, glycerol and diethylene glycol were used as a humectant.

Furthermore, as the azo dye, C.I. Acid Black 2 was used Examples 1 to 30, whereas C.I. Acid Yellow 23, C.I. Acid Red 52 and C.I. Direct blue 78 were used in Examples 31 to 33, respectively.

EXAMPLE 1

| | |
|---|---|
| C.I. Acid Black 2 | 5% |
| glycerol | 10% |
| diethylene glycol | 7% |
| organic silicon compound (A1) | 10% |
| pure water | 68% |

An organic silicon compound (A1) was obtained as follows. Into 180 g (10 mol) of water in a reaction vessel, a mixture of 131.8 g (0.56 mol) of the aminosilane of Formula 1 and 166 g (1.1 mol) of $Si(OCH_3)_4$ was added drop by drop at room temperature. After the whole quantity of the mixture was added, the obtained liquid was stirred for one hour at 60° C. to obtain the organic silicon compound (A1).

EXAMPLE 2

| | |
|---|---|
| C.I. Acid Black 2 | 5% |
| glycerol | 10% |
| diethylene glycol | 7% |
| organic silicon compound (A2) | 10% |
| pure water | 68% |

An organic silicon compound (A2) was obtained by the same procedure as that for the organic silicon compound (A1) of Example 1 except that 163.2 g (0.56 mol) of the aminosilane of Formula 2 was used instead of the aminosilane of Formula 1.

EXAMPLE 3

| | |
|---|---|
| C.I. Acid Black 2 | 5% |
| glycerol | 10% |
| diethylene glycol | 7% |
| organic silicon compound (A3) | 10% |
| pure water | 68% |

An organic silicon compound (A3) was obtained by the same procedure as that for the organic silicon compound (A1) of Example 1 except that 147.5 g (0.56 mol) of the aminosilane of Formula 3 was used instead of the aminosilane of Formula 1.

EXAMPLE 4

| | |
|---|---|
| C.I. Acid Black 2 | 5% |
| glycerol | 10% |
| diethylene glycol | 7% |
| organic silicon compound (A4) | 10% |
| pure water | 68% |

An organic silicon compound (A4) was obtained by the same procedure as that for the organic silicon compound (A1) of Example 1 except that 163.2 g (0.56 mol) of the aminosilane of Formula 4 was used instead of the aminosilane of Formula 1.

EXAMPLE 5

| | |
|---|---|
| C.I. Acid Black 2 | 5% |
| glycerol | 10% |
| diethylene glycol | 7% |
| organic silicon compound (A5) | 10% |
| pure water | 68% |

An organic silicon compound (A5) was obtained by the same procedure as that for the organic silicon compound (A1) of Example 1 except that 147.5 g (0.56 mol) of the aminosilane of Formula 5 was used instead of the aminosilane of Formula 1.

EXAMPLE 6

| | |
|---|---|
| C.I. Acid Black 2 | 5% |
| glycerol | 10% |
| diethylene glycol monobutyl ether | 5% |
| diethylene glycol | 7% |
| organic silicon compound (A1) | 10% |
| pure water | 63% |

The organic silicon compound (A1) is the same as that used in Example 1.

EXAMPLE 7

| | |
|---|---|
| C.I. Acid Black 2 | 5% |
| glycerol | 10% |
| diethylene glycol monobutyl ether | 5% |
| diethylene glycol | 7% |
| organic silicon compound (A2) | 10% |
| pure water | 63% |

The organic silicon compound (A2) is the same as that used in Example 2.

EXAMPLE 8

| | |
|---|---|
| C.I. Acid Black 2 | 5% |
| glycerol | 10% |
| diethylene glycol monobutyl ether | 5% |
| diethylene glycol | 7% |
| organic silicon compound (A3) | 10% |
| pure water | 63% |

The organic silicon compound (A3) is the same as that used in Example 3.

EXAMPLE 9

| | |
|---|---|
| C.I. Acid Black 2 | 5% |
| glycerol | 10% |
| diethylene glycol monobutyl ether | 5% |
| diethylene glycol | 7% |
| organic silicon compound (A4) | 10% |
| pure water | 63% |

The organic silicon compound (A4) is the same as that used in Example 4.

EXAMPLE 10

| | |
|---|---|
| C.I. Acid Black 2 | 5% |
| glycerol | 10% |
| diethylene glycol monobutyl ether | 5% |
| diethylene glycol | 7% |
| organic silicon compound (A5) | 10% |
| pure water | 63% |

The organic silicon compound (A5) is the same as that used in Example 5.

EXAMPLE 11

| | |
|---|---|
| C.I. Acid Black 2 | 5% |
| glycerol | 10% |
| diethylene glycol monobutyl ether | 5% |
| diethylene glycol | 7% |
| organic silicon compound (A6) | 10% |
| pure water | 63% |

An organic silicon compound (A6) was obtained by the same procedure as that for the organic silicon compound (A1) of Example 1 except that 163.2 g (0.56 mol) of the aminosilane of Formula 6 was used instead of the aminosilane of Formula 1.

EXAMPLE 12

| | |
|---|---|
| C.I. Acid Black 2 | 5% |
| glycerol | 10% |
| diethylene glycol monobutyl ether | 5% |
| diethylene glycol | 7% |
| organic silicon compound (A7) | 10% |
| pure water | 63% |

An organic silicon compound (A7) was obtained by the same procedure as that for the organic silicon compound (A1) of Example 1 except that 163.2 g (0.56 mol) of the aminosilane of Formula 7 was used instead of the aminosilane of Formula 1.

EXAMPLE 13

| | |
|---|---|
| C.I. Acid Black 2 | 5% |
| glycerol | 10% |
| diethylene glycol monobutyl ether | 5% |
| diethylene glycol | 7% |
| organic silicon compound (A8) | 10% |
| pure water | 63% |

An organic silicon compound (A8) was obtained by the same procedure as that for the organic silicon compound (A1) of Example 1 except that 163.8 g (0.56 mol) of the aminosilane of Formula 8 was used instead of the aminosilane of Formula 1.

EXAMPLE 14

| | |
|---|---|
| C.I. Acid Black 2 | 5% |
| glycerol | 10% |
| diethylene glycol monobutyl ether | 5% |
| diethylene glycol | 7% |
| organic silicon compound (A9) | 10% |
| pure water | 63% |

An organic silicon compound (A9) was obtained by the same procedure as that for the organic silicon compound (A1) of Example 1 except that 163.2 g (0.56 mol) of the aminosilane of Formula 9 was used instead of the aminosilane of Formula 1.

EXAMPLE 15

| | |
|---|---|
| C.I. Acid Black 2 | 5% |
| glycerol | 10% |
| diethylene glycol monobutyl ether | 5% |
| diethylene glycol | 7% |
| organic silicon compound (A10) | 10% |
| pure water | 63% |

An organic silicon compound (A10) was obtained by the same procedure as that for the organic silicon compound (A1) of Example 1 except that 163.8 g (0.56 mol) of the aminosilane of Formula 10 was used instead of the aminosilane of Formula 1.

EXAMPLE 16

| | |
|---|---|
| C.I. Acid Black 2 | 5% |
| glycerol | 10% |
| diethylene glycol monobutyl ether | 5% |
| diethylene glycol | 7% |
| organic silicon compound (A11) | 10% |
| pure water | 63% |

An organic silicon compound (A11) was obtained by the same procedure as that for the organic silicon compound (A1) of Example 1 except that 149.7 g (0.56 mol) of the aminosilane of Formula 11 was used instead of the aminosilane of Formula 1.

EXAMPLE 17

| | |
|---|---|
| C.I. Acid Black 2 | 5% |
| glycerol | 10% |
| diethylene glycol monobutyl ether | 5% |
| diethylene glycol | 7% |
| organic silicon compound (A12) | 10% |
| pure water | 63% |

An organic silicon compound (A12) was obtained by the same procedure as that for the organic silicon compound (A1) of Example 1 except that 134.0 g (0.56 mol) of the aminosilane of Formula 12 was used instead of the aminosilane of Formula 1.

EXAMPLE 18

| | |
|---|---|
| C.I. Acid Black 2 | 5% |
| glycerol | 10% |
| diethylene glycol monobutyl ether | 5% |
| diethylene glycol | 7% |
| organic silicon compound (A13) | 10% |
| pure water | 63% |

An organic silicon compound (A13) was obtained by the same procedure as that for the organic silicon compound (A1) of Example 1 except that 185.6 g (0.56 mol) of the aminosilane of Formula 13 was used instead of the aminosilane of Formula 1.

EXAMPLE 19

| | |
|---|---|
| C.I. Acid Black 2 | 5% |
| glycerol | 10% |
| diethylene glycol monobutyl ether | 5% |
| diethylene glycol | 7% |
| organic silicon compound (C1) | 10% |
| pure water | 63% |

An organic silicon compound (C1) was obtained as follows. Into 201.3 g (0.56 mol) of the aminosilane of Formula 14 in a reaction vessel, 49 g (0.66 mol) of 2,3-epoxy-1-propanol was added drop by drop. After the whole quantity of 2,3-epoxy-1-propanol was added, the obtained liquid was stirred for five hours at 80° C. so as to let the amino group and the epoxy group react with each other to obtain a hydrolyzable silane (B1). A mixture of 120 g (6.67 mol) of water, 86.7 g (0.2 mol) of the hydrolyzable silane (B1) and 30.4 g (0.2 mol) of $Si(OCH_3)_4$ was added into another reaction vessel. After the whole quantity of the mixture was added, the mixture was left standing for one hour at 60° C. to let the reaction proceed to obtain the organic silicon compound (C1).

EXAMPLE 20

| | |
|---|---|
| C.I. Acid Black 2 | 5% |
| glycerol | 10% |
| diethylene glycol monobutyl ether | 5% |
| diethylene glycol | 7% |
| organic silicon compound (C2) | 10% |
| pure water | 63% |

An organic silicon compound (C2) was obtained by the same procedure as that for the organic silicon compound (C1) of Example 19 except that 201.3 g (0.56 mol) of the aminosilane of Formula 15 was used instead of the aminosilane of Formula 14 to obtain a hydrolyzable silane (B2) through a reaction between the amino group and the epoxy group, and the hydrolyzable silane (B2) was used to obtain the organic silicon compound (C2).

EXAMPLE 21

| | |
|---|---|
| C.I. Acid Black 2 | 5% |
| glycerol | 10% |
| diethylene glycol monobutyl ether | 5% |
| diethylene glycol | 7% |
| organic silicon compound (C3) | 10% |
| pure water | 63% |

An organic silicon compound (C3) was obtained by the same procedure as that for the organic silicon compound (C1) of Example 19 except that 201.3 g (0.56 mol) of the aminosilane of Formula 16 was used instead of the aminosilane of Formula 14 to obtain a hydrolyzable silane (B3) through a reaction between the amino group and the epoxy group, and the hydrolyzable silane (B3) was used to obtain the organic silicon compound (C3).

EXAMPLE 22

| | |
|---|---|
| C.I. Acid Black 2 | 5% |
| glycerol | 10% |
| diethylene glycol monobutyl ether | 5% |
| diethylene glycol | 7% |
| organic silicon compound (C4) | 10% |
| pure water | 63% |

An organic silicon compound (C4) was obtained by the same procedure as that for the organic silicon compound (C1) of Example 19 except that 201.9 g (0.56 mol) of the aminosilane of Formula 17 was used instead of the aminosilane of Formula 14 to obtain a hydrolyzable silane (B4) through a reaction between the amino group and the epoxy group, and the hydrolyzable silane (B4) was used to obtain the organic silicon compound (C4).

EXAMPLE 23

| | |
|---|---|
| C.I. Acid Black 2 | 5% |
| glycerol | 10% |
| diethylene glycol monobutyl ether | 5% |
| diethylene glycol | 7% |
| organic silicon compound (C5) | 10% |
| pure water | 63% |

An organic silicon compound (C5) was obtained by the same procedure as that for the organic silicon compound (C1) of Example 19 except that 181.6 g (0.56 mol) of the aminosilane of Formula 18 was used instead of the aminosilane of Formula 14 to obtain a hydrolyzable silane (B5) through a reaction between the amino group and the epoxy group, and the hydrolyzable silane (B5) was used to obtain the organic silicon compound (C6).

EXAMPLE 24

| | |
|---|---|
| C.I. Acid Black 2 | 5% |
| glycerol | 10% |
| diethylene glycol monobutyl ether | 5% |
| diethylene glycol | 7% |
| organic silicon compound (C6) | 10% |
| pure water | 63% |

An organic silicon compound (C6) was obtained by the same procedure as that for the organic silicon compound (C1) of Example 19 except that 201.3 g (0.56 mol) of the aminosilane of Formula 19 was used instead of the aminosilane of Formula 14 to obtain a hydrolyzable silane (B6) through a reaction between the amino group and the epoxy group, and the hydrolyzable silane (B6) was used to obtain the organic silicon compound (C6).

EXAMPLE 25

| | |
|---|---|
| C.I. Acid Black 2 | 5% |
| glycerol | 10% |
| diethylene glycol monobutyl ether | 5% |
| diethylene glycol | 7% |
| organic silicon compound (C7) | 10% |
| pure water | 63% |

An organic silicon compound (C7) was obtained by the same procedure as that for the organic silicon compound (C1) of Example 19 except that 219.2 g (0.56 mol) of the aminosilane of Formula 20 was used instead of the aminosilane of Formula 14 to obtain a hydrolyzable silane (B7) through a reaction between the amino group and the epoxy group, and the hydrolyzable silane (B7) was used to obtain the organic silicon compound (C7).

EXAMPLE 26

| | |
|---|---|
| C.I. Acid Black 2 | 5% |
| glycerol | 10% |
| diethylene glycol monobutyl ether | 5% |
| diethylene glycol | 7% |
| organic silicon compound (C8) | 10% |
| pure water | 63% |

An organic silicon compound (C8) was obtained by the same procedure as that for the organic silicon compound (C1) of Example 19 except that 250.7 g (0.56 mol) of the aminosilane of Formula 21 was used instead of the aminosilane of Formula 14 to obtain a hydrolyzable silane (B8) through a reaction between the amino group and the epoxy group, and the hydrolyzable silane (B8) was used to obtain the organic silicon compound (C8).

EXAMPLE 27

| C.I. Acid Black 2 | 5% |
|---|---|
| glycerol | 10% |
| diethylene glycol monobutyl ether | 5% |
| diethylene glycol | 7% |
| organic silicon compound (C9) | 10% |
| pure water | 63% |

An organic silicon compound (C9) was obtained by the same procedure as that for the organic silicon compound (C1) of Example 19 except that 246.0 g (0.56 mol) of the aminosilane of Formula 22 was used instead of the aminosilane of Formula 14 to obtain a hydrolyzable silane (B9) through a reaction between the amino group and the epoxy group, and the hydrolyzable silane (B9) was used to obtain the organic silicon compound (C9).

EXAMPLE 28

| C.I. Acid Black 2 | 5% |
|---|---|
| glycerol | 10% |
| diethylene glycol monobutyl ether | 5% |
| diethylene glycol | 7% |
| organic silicon compound (C10) | 10% |
| pure water | 63% |

An organic silicon compound (C10) was obtained by the same procedure as that for the organic silicon compound (C1) of Example 19 except that 203.5 g (0.56 mol) of the aminosilane of Formula 23 was used instead of the aminosilane of Formula 14 to obtain a hydrolyzable silane (B10) through a reaction between the amino group and the epoxy group, and the hydrolyzable silane (B10) was used to obtain the organic silicon compound (C10).

EXAMPLE 29

| C.I. Acid Black 2 | 5% |
|---|---|
| glycerol | 10% |
| diethylene glycol monobutyl ether | 5% |
| diethylene glycol | 7% |
| organic silicon compound (C11) | 10% |
| pure water | 63% |

An organic silicon compound (C11) was obtained by the same procedure as that for the organic silicon compound (C1) of Example 19 except that 192.4 g (0.56 mol) of the aminosilane of Formula 24 was used instead of the aminosilane of Formula 14 to obtain a hydrolyzable silane (B11) through a reaction between the amino group and the epoxy group, and the hydrolyzable silane (B11) was used to obtain the organic silicon compound (C11).

EXAMPLE 30

| C.I. Acid Black 2 | 5% |
|---|---|
| glycerol | 10% |
| diethylene glycol monobutyl ether | 5% |
| diethylene glycol | 7% |
| organic silicon compound (C12) | 10% |
| pure water | 63% |

An organic silicon compound (C12) was obtained by the same procedure as that for the organic silicon compound (C1) of Example 19 except that 223.8 g (0.56 mol) of the aminosilane of Formula 25 was used instead of the aminosilane of Formula 14 to obtain a hydrolyzable silane (B12) through a reaction between the amino group and the epoxy group, and the hydrolyzable silane (B12) was used to obtain the organic silicon compound (C12).

EXAMPLE 31

| C.I. Acid Yellow 23 | 5% |
|---|---|
| glycerol | 10% |
| diethylene glycol monobutyl ether | 5% |
| diethylene glycol | 7% |
| organic silicon compound (A1) | 10% |
| pure water | 63% |

The organic silicon compound (A1) is the same as that used in Example 1.

EXAMPLE 32

| C.I. Acid Red 52 | 5% |
|---|---|
| glycerol | 10% |
| diethylene glycol monobutyl ether | 5% |
| diethylene glycol | 7% |
| organic silicon compound (A1) | 10% |
| pure water | 63% |

The organic silicon compound (A1) is the same as that used in Example 1.

EXAMPLE 33

| C.I. Direct Blue 78 | 5% |
|---|---|
| glycerol | 10% |
| diethylene glycol monobutyl ether | 5% |
| diethylene glycol | 7% |
| organic silicon compound (A1) | 10% |
| pure water | 63% |

The organic silicon compound (A1) is the same as that used in Example 1.

Then, two other ink compositions (Comparative Examples 1 and 2) were produced for the purpose of comparison. Again, in the ink composition shown in each comparative example below, the amount of each component is given in % by mass. In Comparative Examples 1 and 2, an alkyl group, an alkoxyl group, or the like, was not introduced to the carbon atom at the α-position of the amino group in the hydrolyzable aminosilane compound, as in Examples 1 to 33. Note that no penetrant was used in Comparative Examples 1 and 2.

Comparative Example 1

| C.I. Acid Black 2 | 5% |
|---|---|
| glycerol | 10% |
| diethylene glycol | 7% |
| organic silicon compound (A14) | 10% |
| pure water | 68% |

An organic silicon compound (A14) was obtained by the same procedure as that for the organic silicon compound (A1) of Example 1 except that 100 g (0.56 mol) of $H_2NCH_2CH_2CH_2Si(OCH_3)_3$ was used instead of the aminosilane of Formula 1.

Comparative Example 2

| C.I. Acid Black 2 | 5% |
|---|---|
| glycerol | 10% |
| diethylene glycol | 7% |
| organic silicon compound (C13) | 10% |
| pure water | 68% |

An organic silicon compound (C13) was obtained by the same procedure as that for the organic silicon compound (C1) of Example 19 except that 100 g (0.56 mol) of $H_2NCH_2CH_2CH_2Si(OCH_3)_3$ was used instead of the aminosilane of Formula 14 to obtain a hydrolyzable silane (B13) through a reaction between the amino group and the epoxy group, and the hydrolyzable silane (B13) was used to obtain the organic silicon compound (C13).

Then, the ink compositions of Examples 1 to 33 and those of Comparative Examples 1 and 2 were left standing under a 70° C. atmosphere for three months in order to examine the preservation stability thereof.

As a result, the ink compositions of Comparative Examples 1 and 2 were turned from black to blackish brown, whereas no discoloration or fading was observed for any of the ink compositions of Examples 1 to 33. Thus, discoloration or fading of ink does not occur if a straight-chain or branched alkyl group whose carbon number is two or more, an alkoxyl group, a phenyl group or a derivative group thereof, a phenoxyl group, or a six-membered or larger cycloalkyl group is introduced to the carbon atom at the α-position of the amino group in an aminosilane compound. This is because the substituent serves as steric hindrance to the amino group of the aminosilane compound attacking the azo group of the azo dye, preventing the amino group from coming within a certain distance of the azo group at which the amino group can attack the azo group, thereby maintaining the double bond between the two nitrogen atoms in the azo group.

Then, using the ink composition of each of Examples 1 to 33 and Comparative Examples 1 and 2, an image was formed on plain paper ("Xerox4024" manufactured by Xerox Corporation) by a commercially-available printer that discharges ink using a piezoelectric actuator (which is similar to that of the embodiment described above but has a substantially larger thickness). Each sheet of paper with the image formed thereon was immersed in pure water, and then left standing at room temperature until it is dried so as to examine the presence/absence of image bleeding.

As a result, for each of the ink compositions of Examples 1 to 5 and Comparative Examples 1 and 2, although slight bleeding was observed from the printed letters, the water-resistivity was substantially better than that without an aminosilane compound. Moreover, no bleeding was observed for Examples 6 to 33 in which a penetrant was used. This indicates that a high water-resistivity can be maintained even if a substituent as described above is introduced to the carbon atom at the α-position of the amino group in an aminosilane compound, and that the water-resistivity can be further improved by using a penetrant.

What is claimed is:

1. An ink composition for ink jet recording, comprising an azo dye, a humectant, water, and an amino-group-containing water-soluble compound that undergoes condensation polymerization in the absence of the water,
   wherein a substituent selected from a straight-chain or branched alkyl group whose carbon number is two or more, an alkoxyl group, a phenyl group or a derivative group thereof, a phenoxyl group, or a six-membered or larger cycloalkyl group is introduced to a carbon atom at an α-position of the amino group in the amino-group-containing water-soluble compound that undergoes condensation polymerization in the absence of water to enclose the azo dye and to improve water-resistivity of the ink composition, wherein said substituent serves as steric hindrance to said amino group attacking an azo group of the azo dye and prevents discoloration and/or fading of the ink composition.

2. The ink composition for ink jet recording of claim 1, wherein the amino-group-containing water-soluble compound that undergoes condensation polymerization in the absence of water is a hydrolyzable aminosilane compound.

3. The ink composition for ink jet recording of claim 1, further comprising a penetrant.

4. An ink composition for ink jet recording, comprising an azo dye, a humectant, water, and an amino-group-containing water-soluble compound that undergoes condensation polymerization in the absence of the water,
   wherein a substituent is introduced to a carbon atom at an α-position of the amino group in the amino-group-containing water-soluble compound that undergoes condensation polymerization in the absence of water to enclose the azo dye and to improve water-resistivity of the ink composition, the substituent serving as steric hindrance to the amino group attacking an azo group of the azo dye and prevents discoloration and/or fading of the ink composition.

5. The ink composition for ink jet recording of claim 4, wherein the amino-group-containing water-soluble compound that undergoes condensation polymerization in the absence of water is a hydrolyzable aminosilane compound.

6. The ink composition for ink jet recording of claim 4, further comprising a penetrant.

7. A cartridge, comprising an ink composition for ink jet recording, the ink composition including an azo dye, a humectant, water, and an amino-group-containing water-soluble compound that undergoes condensation polymerization in the absence of the water,
   wherein a straight-chain or branched alkyl group whose carbon number is two or more, an alkoxyl group, a phenyl group or a derivative group thereof, a phenoxyl group, or a six-membered or larger cycloalkyl group is introduced to a carbon atom at an α-position of the amino group in the amino-group-containing water-soluble compound that undergoes condensation polymerization in the absence of water to enclose the azo dye and to improve water-resistivity of the ink composition wherein said substituent serves as steric hindrance to said amino group attacking an azo group of the azo dye and prevents discoloration and/or fading of the ink composition.

8. A cartridge, comprising an ink composition for ink jet recording, the ink composition including an azo dye, a humectant, water, and an amino-group-containing water-soluble compound that undergoes condensation polymerization in the absence of the water, wherein a substituent is introduced to a carbon atom at an α-position of the amino group in the amino-group-containing water-soluble compound that undergoes condensation polymerization in the absence of water to enclose the azo dye and to improve water-resistivity of the ink composition, the substituent serving as steric hindrance to the amino group attacking an azo group of the azo dye and prevents discoloration and/or fading of the ink composition.

9. A recording apparatus for performing a recording operation by discharging an ink composition for ink jet recording onto a recording medium, the ink composition including an azo dye, a humectant, water, and an amino-group-containing water-soluble compound that undergoes condensation polymerization in the absence of the water, wherein a straight-chain or branched alkyl group whose carbon number is two or more, an alkoxyl group, a phenyl group or a derivative group thereof, a phenoxyl group, or a six-membered or larger cycloalkyl group is introduced to a carbon atom at an α-position of the amino group in the amino-group-containing water-soluble compound that undergoes condensation polymerization in the absence of water to enclose the azo dye to improve water-resistivity of the ink composition, wherein said substituent serves as steric hindrance to said amino group attacking an azo group of the azo dye and prevents discoloration and/or fading of the ink composition.

10. A recording apparatus for performing a recording operation by discharging an ink composition for ink jet recording onto a recording medium, the ink composition including an azo dye, a humectant, water, and an amino-group-containing water-soluble compound that undergoes condensation polymerization in the absence of the water, wherein a substituent is introduced to a carbon atom at an α-position of the amino group in the amino-group-containing water-soluble compound that undergoes condensation polymerization in the absence of water to enclose the azo dye and to improve water-resistivity of the ink composition, the substituent serving as steric hindrance to the amino group attacking an azo group of the azo dye and prevents discoloration and/or fading of the ink composition.

* * * * *